(12) United States Patent
Lee et al.

(10) Patent No.: US 11,211,962 B2
(45) Date of Patent: Dec. 28, 2021

(54) SEALING UNIT AND WIRELESS INTERCOM DEVICE USING THE SAME

(71) Applicant: Goldtek Technology Co., Ltd., New Taipei (TW)

(72) Inventors: Lih-Sin Lee, Taipei (TW); Wei-Cheng Wu, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 0 days.

(21) Appl. No.: 16/983,228

(22) Filed: Aug. 3, 2020

(65) Prior Publication Data
US 2021/0126665 A1 Apr. 29, 2021

(30) Foreign Application Priority Data
Oct. 29, 2019 (TW) .................................. 108139096

(51) Int. Cl.
| | |
|---|---|
| *H04B 1/38* | (2015.01) |
| *H04B 1/3888* | (2015.01) |
| *H04M 1/72513* | (2021.01) |
| *G06F 1/16* | (2006.01) |
| *F16J 15/02* | (2006.01) |
| *H04M 1/02* | (2006.01) |

(52) U.S. Cl.
CPC .......... *H04B 1/3888* (2013.01); *F16J 15/022* (2013.01); *G06F 1/1656* (2013.01); *H04M 1/0249* (2013.01); *H04M 1/72513* (2013.01); *H04B 2001/3894* (2013.01)

(58) Field of Classification Search
CPC ......... H04B 1/3888; H04B 2001/3894; H04M 1/72513; H04M 1/0249; G06F 1/1656; F16J 15/022; F16J 15/104; F16J 15/067
USPC ....................................................... 455/575.8
See application file for complete search history.

(56) References Cited

U.S. PATENT DOCUMENTS

2007/0188307 A1* 8/2007 Lai .................... H04N 7/186
340/286.06

* cited by examiner

*Primary Examiner* — Shaima Q Aminzay
(74) *Attorney, Agent, or Firm* — ScienBiziP, P.C.

(57) ABSTRACT

A sealing unit used to block liquid comprises a sealing block, a receiving hole, a wire-through hole, and a sealing piece. The receiving hole penetrates the sealing block. The sealing piece is received in the receiving hole. A surface of the sealing block is in contact with the receiving hole. A material of the sealing piece is elastic material. The sealing piece is penetrated by the wire-through hole and forms an open penetrating structure. The present disclosure also provides a wireless intercom device using the sealing unit.

10 Claims, 4 Drawing Sheets

SEALING UNIT AND WIRELESS INTERCOM DEVICE USING THE SAME

FIELD

The subject matter relates to a sealing unit and a wireless intercom device using the same.

BACKGROUND

Wireless intercom devices are a common type of electronic devices. The usage scene of the wireless intercom devices is outdoors, and the wireless intercom devices require strong water resistance. The casing of the wireless intercom device is usually provided with an opening, which is generally sealed by using a glue or a snap structure. However, all of the above-mentioned structures have problems of difficulty in manufacture and difficulty in disassembly.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
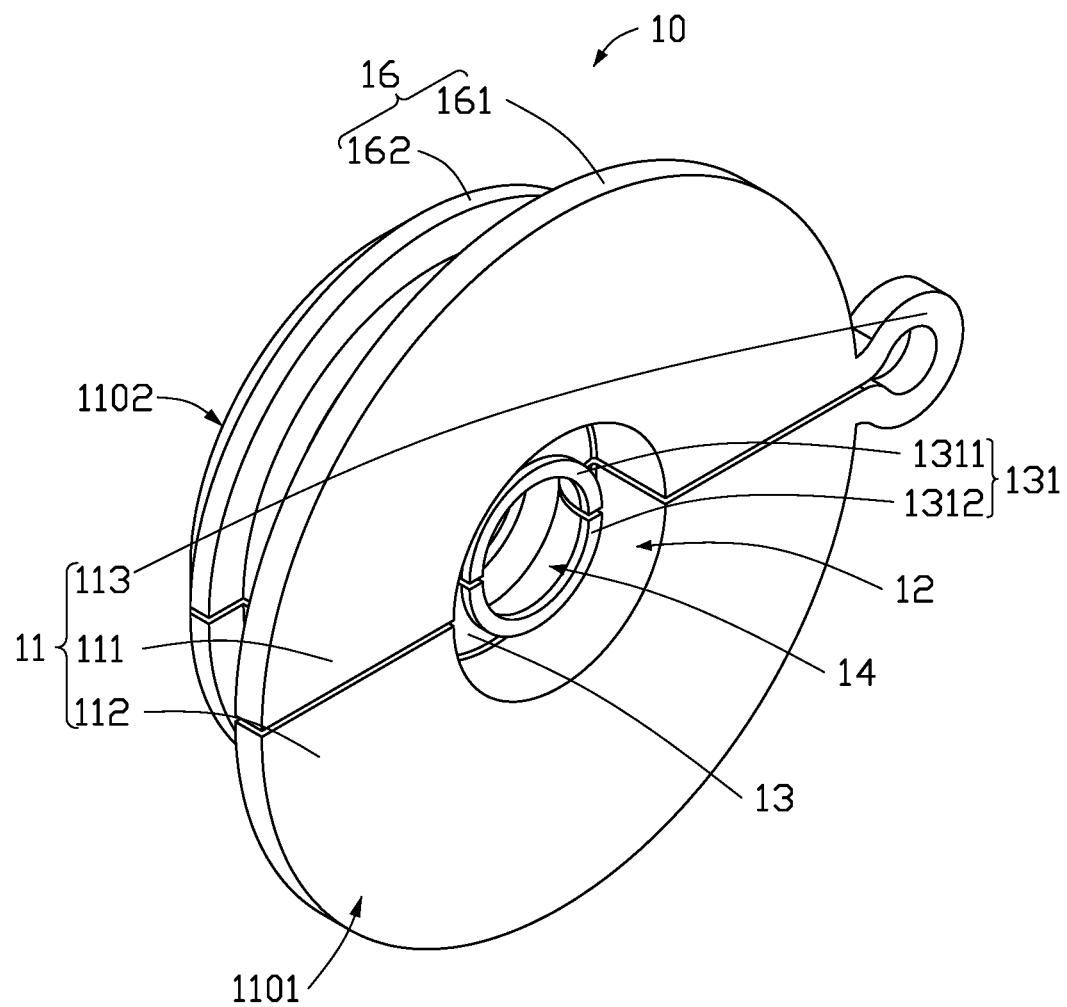
FIG. 1 is a perspective view of a sealing unit.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
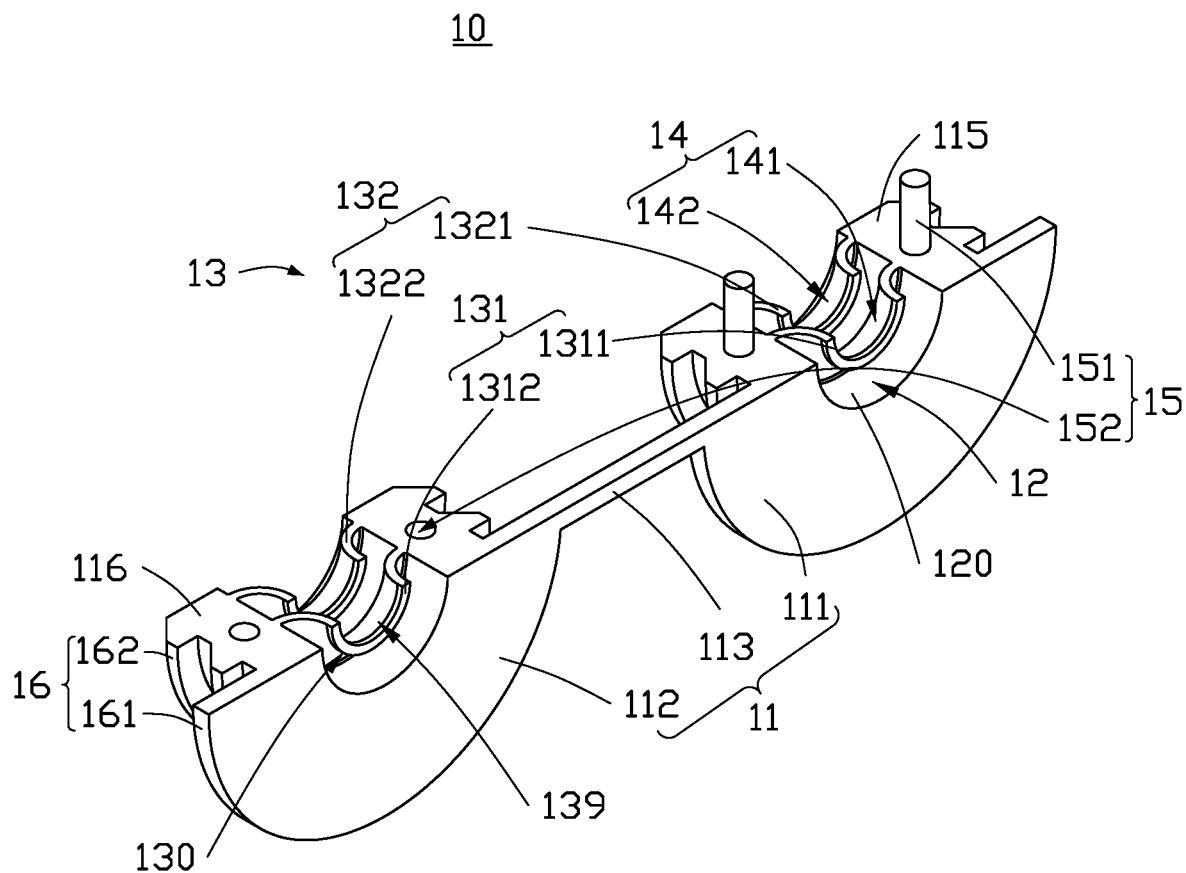
FIG. 2 is a perspective view of the sealing unit of FIG. 1 in a disengaged state.

As shown in FIGS. 1 and 2, the present disclosure provides a sealing unit 10. The sealing unit 10 can block liquid. The sealing unit 10 includes a sealing block 11, a receiving hole 12, a sealing piece 13, and a wire-through hole 14. The receiving hole 12 penetrates the sealing block 11. The sealing piece 13 is disposed in the receiving hole 12. The surface of the sealing block 11 in contact with the receiving hole 12 is an inner surface 120. Outer edges 130 of the sealing piece 13 are connected to the inner surface 120. The wire-through hole 14 penetrates the sealing piece 13. The sealing piece 13 is only penetrated by the wire-through hole 14 and forms an open penetrating structure 139. The material of the sealing piece 13 is elastic material.

The sealing block 11 is an elastic structure. In one embodiment, the sealing block 11 can be rubber with a hardness value of 50.

In one embodiment, the sealing block 11 includes a first sealing block 111 and a second sealing block 112. The first sealing block 111 and the second sealing block 112 are engaged to form the sealing block 11. The sealing block 11 further includes a connecting portion 113. The connecting portion 113 is respectively connected to the first sealing block 111 and the second sealing block 112. The connecting portion 113 can prevent the first sealing block 111 and the second sealing block 112 from being lost when they are not engaged.

The first sealing block 111 includes a first surface 115. The second sealing block 112 includes a second surface 116. When the first sealing block 111 is engaged with the second sealing block 112, the first surface 115 is in contact with the second surface 116.

The sealing unit 10 further includes an engaging structure 15. The engaging structure 15 includes a first engaging unit 151 and a second engaging unit 152. The first engaging unit 151 is connected to the first surface 115. The second engaging unit 152 is connected to the second surface 116. The first engaging unit 151 and the second engaging unit 152 are detachably connected. Therefore, the first sealing block 111 and the second sealing block 112 are detachably fixedly connected.

In one embodiment, the first sealing block 111 and the second sealing block 112 have a mirror-symmetric structure. The first engaging unit 151 is formed by the first surface 115 extending outward. The second engaging unit 152 is formed inwardly by the second surface 116.

In other embodiments, the engaging structure 15 may also be other engaging structures, such as a tooth shape.

The first sealing block 111 and the second sealing block 112 are engaged to form the receiving hole 12. The receiving hole 12 includes the inner surface 120. The inner surface 120 is the inner hole wall of the receiving hole 12.

The sealing piece 13 includes at least a first sealing sheet 131 and a second sealing sheet 132. The first sealing sheet 131 and the second sealing sheet 132 are spaced apart. The wire-through hole 14 includes a first half-wire-through hole 141 and a second half-wire-through hole 142. The first half-wire-through hole 141 penetrates the first sealing sheet 131. The second half-wire-through hole 142 penetrates the second sealing sheet 132.

In one embodiment, the first sealing sheet 131 includes a first sub-sealing piece 1311 and a second sub-sealing piece 1312. The second sealing sheet 132 includes a third sub-sealing piece 1321 and a fourth sub-sealing piece 1322. The first sub-sealing piece 1311, the second sub-sealing piece 1312, the third sub-sealing piece 1321, and the fourth sub-sealing piece 1322 are disposed in the receiving hole 12. The first sub-sealing piece 1311 and the third sub-sealing piece 1321 are connected to the first sealing block 111. The second sub-sealing piece 1312 and the fourth sub-sealing piece 1322 are connected to the second sealing block 112. The first sub-sealing piece 1311 and the second sub-sealing piece 1312 surround and form the first half-wire-through hole 141. The third sub-sealing piece 1321 and the fourth sub-sealing piece 1322 enclose and form the second half-wire-through hole 142.

In one embodiment, the sealing piece 13 may be the sheet-shaped elastic material. In other embodiments, the sealing piece 13 is provided with an elastic material near the edge of the wire-through hole 14.

The sealing unit 10 further includes a protrusion 16. In one embodiment, the protrusion 16 includes a first raised part 161 and a second raised part 162. The first raised part 161 and the second raised part 162 are disposed on the surface of the sealing unit 10 away from the receiving hole 12.

The sealing block 11 includes a first end 1101 and a second end 1102. The first raised part 161 and the second raised part 162 are disposed around the periphery of the sealing block 11. The first raised part 161 is disposed around the first end 1101. The second raised part 162 is disposed between the first end 1101 and the second end 1102; or, the second raised part 162 is disposed around the second end 1102. The protrusion height of the first raised part 161 is greater than the protrusion height of the second raised part 162.

In one embodiment, the connecting portion 113 is connected to the first raised part 161. The sealing unit 10 is manufactured by an injection molding process.

Figure 3:
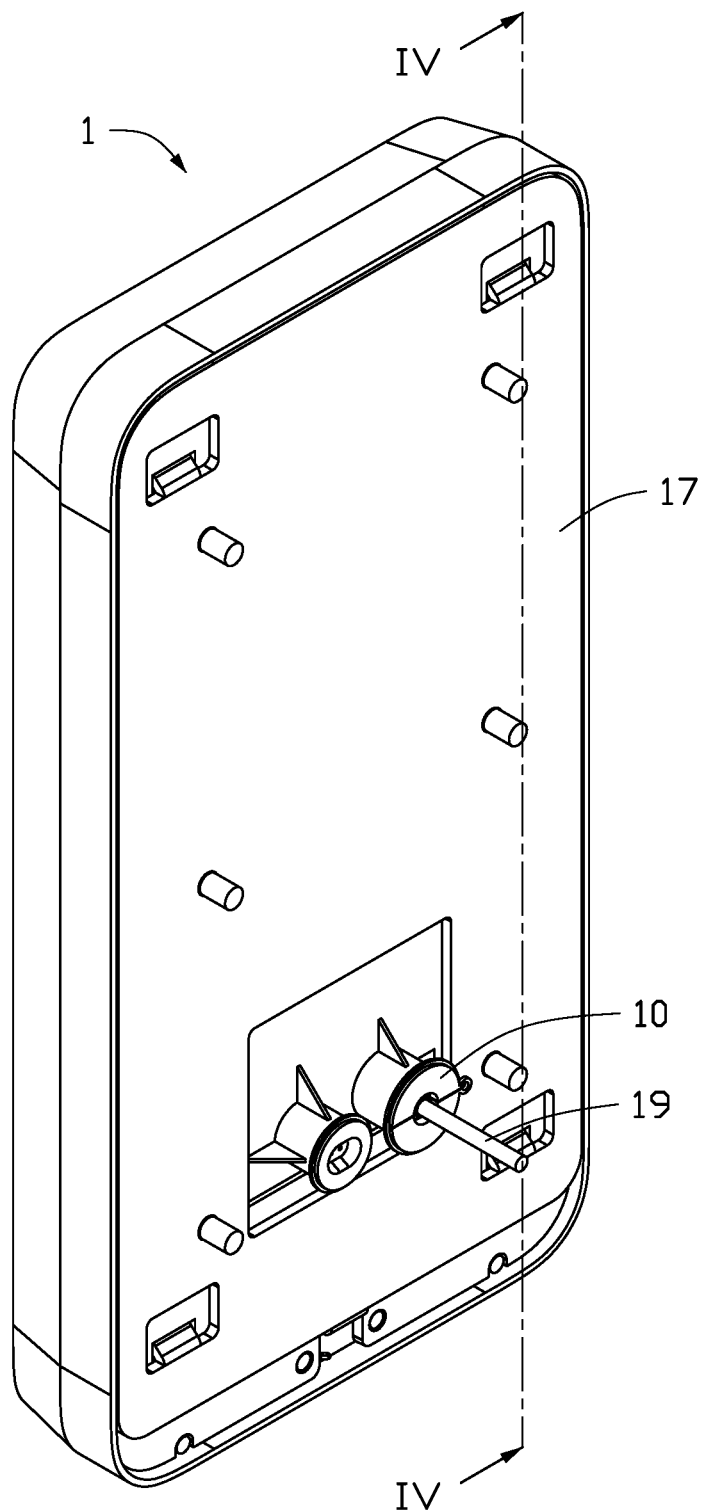
FIG. 3 is a perspective view of a wireless intercom device.
Figure 4:
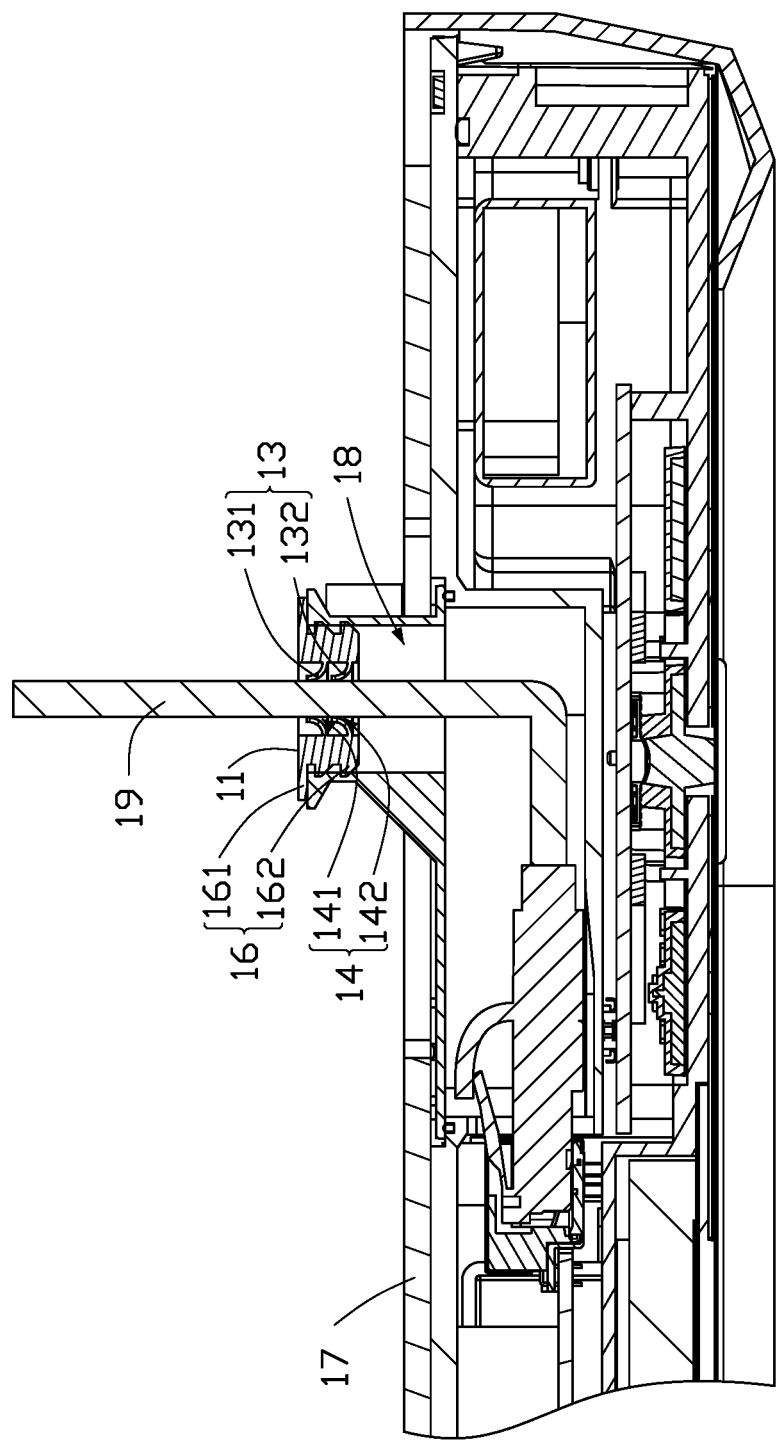
FIG. 4 is a cross-sectional view along line IV-IV of FIG. 3.

As shown in FIGS. 3 and 4, the sealing unit 10 can be applied to a wireless intercom device 1 to improve the waterproof performance of an antenna 19 of the wireless intercom device 1.

The wireless intercom device 1 includes a housing 17, the antenna 19, and the sealing unit 10.

At least one signal overflow hole 18 is defined in the housing 17. At least part of the antenna 19 is disposed inside the housing 17. At least part of the antenna 19 extends to the outside of the housing 17 through the signal overflow hole 18.

At least part of the sealing unit 10 is disposed in the signal overflow hole 18. The first raised part 161 is disposed at the edge of the signal overflow hole 18. The first raised part 161 covers the outer edge of the signal overflow hole 18. The second raised part 162 is disposed in the signal overflow hole 18. The second raised part 162 is in contact with and pressed against the inner wall of the signal overflow hole 18. The sealing unit 10 is used to prevent moisture from entering the housing 17 through the signal overflow hole 18.

The antenna 19 passes through the wire-through hole 14. The antenna 19 is cylindrical. The diameter of the cross-section of the antenna 19 is larger than the diameter of the wire-through hole 14.

In one embodiment, the antenna 19 passes through the second half-wire-through hole 142 and the first half-wire-through hole 141 in sequence. The first sealing sheet 131 is closely attached to the antenna 19. The second sealing sheet 132 is closely attached to the antenna 19. The portion of the sealing piece 13 that contacts the antenna 19 is bent toward the outside of the housing 17.

In one embodiment, a portion of the sealing piece 13 surrounding the wire-through hole 14 has a natural curvature. In another embodiment, the sealing piece 13 is deformable material, and when the antenna 19 passes through the wire-through hole 14, at least part of the sealing piece 13 is deformed and partially attached to the surface of the antenna 19. The above structure effectively isolates water vapor while ensuring the signal transmission capability of the wireless intercom device 1.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless intercom device comprising:
   a housing;
   an antenna;
   a sealing unit comprising:
      a sealing block;
      a receiving hole, wherein the receiving hole penetrates the sealing block, a surface of the sealing block is in contact with the receiving hole;
      a sealing piece, wherein the sealing piece is received in the receiving hole, a material of the sealing piece is elastic material; and
      a wire-through hole, wherein the sealing piece is penetrated by the wire-through hole and forms an open penetrating structure; and
   wherein the sealing unit further comprises a protrusion, the protrusion comprises a first raised part and a second raised part, the sealing block comprises a first end and a second end, the first end and the second end are spaced apart, the first raised part and the second raised part are disposed around a periphery of the sealing block, the first raised part is disposed around the first end, the second raised part is disposed between the first end and the second end, a protrusion height of the first raised part is greater than a protrusion height of the second raised part.

2. The wireless intercom device of claim 1, wherein a signal overflow hole is defined in the housing, at least part of the antenna is received in the housing, at least part of the antenna extends outside of the housing through the signal overflow hole.

3. The wireless intercom device of claim 2, wherein at least part of the sealing unit is received in the signal overflow hole, the first raised part is disposed at an edge of the signal overflow hole, the first raised part covers the signal overflow hole, the second raised part is received in the signal overflow hole, the second raised part is in contact with and abutted against an inner wall of the signal overflow hole.

4. The wireless intercom device of claim 3, wherein the antenna passes through the wire-through hole, a diameter of a cross-section of the antenna is larger than a diameter of the wire-through hole, a portion of the sealing piece that contacts the antenna is bent toward the outside of the housing.

5. The sealing unit of claim 1, wherein the sealing piece comprises a first sealing sheet and a second sealing sheet, the first sealing sheet and the second sealing sheet are spaced apart, the wire-through hole comprises a first half-wire-through hole and a second half-wire-through hole, the first half-wire-through hole penetrates the first sealing sheet, the second half-wire-through hole penetrates the second sealing sheet.

6. The sealing unit of claim 5, wherein the sealing block comprises a first sealing block and a second sealing block; the sealing unit further comprises an engaging structure, the engaging structure is connected to the sealing block, the engaging structure comprises a first engaging unit and a second engaging unit, the first engaging unit is connected to the first sealing block, the second engaging unit is connected to the second sealing block, the first engaging unit and the second engaging unit are detachably connected, the first sealing block is coupled to the second sealing block by the first engaging unit and the second engaging unit.

7. The sealing unit of claim 6, wherein the first sealing block and the second sealing block are engaged to form the receiving hole, the first sealing sheet comprises a first sub-sealing piece and a second sub-sealing piece, the second sealing sheet comprises a third sub-sealing piece and a fourth sub-sealing piece, the first sub-sealing piece, the second sub-sealing piece, the third sub-sealing piece, and the fourth sub-sealing piece are disposed in the receiving hole, the first sub-sealing piece and the third sub-sealing piece are connected to the first sealing block, the second sub-sealing piece and the fourth sub-sealing piece are connected to the second sealing block, the first sub-sealing piece and the second sub-sealing piece form the first half-wire-through hole, the third sub-sealing piece and the fourth sub-sealing piece form the second half-wire-through hole.

8. The wireless intercom device of claim 6, wherein the antenna passes through the wire-through hole, the antenna is cylindrical, a diameter of a cross-section of the antenna is larger than a diameter of the wire-through hole.

9. The wireless intercom device of claim 6, wherein the antenna passes through the wire-through hole, a diameter of a cross-section of the antenna is larger than a diameter of the wire-through hole, a portion of the sealing piece that contacts the antenna is bent toward the outside of the housing.

10. The wireless intercom device of claim 5, wherein a signal overflow hole is defined in the housing, at least part of the antenna is received in the housing, at least part of the antenna extends outside of the housing through the signal overflow hole.

* * * * *